Patented Jan. 7, 1941

2,227,839

UNITED STATES PATENT OFFICE 2,227,839

STEROL COMPOUND AND METHOD OF OBTAINING SAME

Russell Earl Marker, State College, Pa., assignor to Parke, Davis & Company, Detroit, Mich., a corporation of Michigan No Drawing. Application June 27, 1938,
Serial No. 216,157

16 Claims. (Cl. 260—397)

The invention relates to the preparation of dihydroxy and equivalent derivatives of sterols having at $C_{17}$ of the sterol structure a side-chain of ten carbon atoms. More particularly, the invention includes preparation of 4-hydroxy and 6-hydroxy and equivalent derivatives of said sterols and use of the 4-hydroxy derivatives for the preparation of their corresponding dehydrated keto derivatives.

It has now been found that a sterol of twenty-nine carbon atoms having a $C_{17}$ side-chain of ten carbon atoms, such as sitosterol, stigmasterol, ostreasterol, cinchol, fucosterol, and the like, can be partially oxidized by selenium dioxide or selenious acid oxidation with the production of 4-hydroxy and 6-hydroxy derivatives. It has further been found that the 4-hydroxy derivatives thus obtained can be dehydrated with the production of $\alpha,\beta$-unsaturated ketonic sterol compounds which are valuable intermediates for the production of compounds of physiological and therapeutic usefulness.

The $C_4$- and $C_6$-substituted derivatives of the $C_{29}$ sterols, where the 4-hydroxy and 6-hydroxy groups are replaced by equivalent substituents, can be easily prepared by carrying out known reactions for converting the 4-hydroxy and 6-hydroxy groups into groups which upon hydrolysis can be converted into hydroxyl groups, such as oxyacyl, oxyalkyl, oxyaryl, oxyaralkyl, halogen, and the like.

The new $C_4$-substituted compounds of the invention have the general formula,

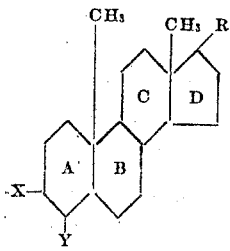

where ring B is saturated or unsaturated and R represents a hydrocarbon side-chain containing ten carbon atoms and X and Y indicate hydroxyl or a group which upon hydrolysis is converted into a hydroxyl group, such as O-acyl, O-alkyl, O-aryl, or halogen.

The $C_6$-substituted compounds of the invention have the general formula,

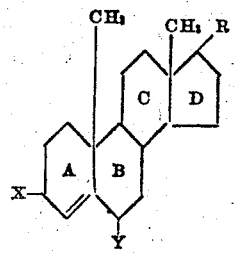

where R represents a hydrocarbon side-chain containing ten carbon atoms and X and Y indicate hydroxyl or a group which upon hydrolysis is converted into a hydroxyl group, such as O-acyl, O-alkyl, O-aryl, or halogen.

The invention is illustrated by the following examples:

EXAMPLE 1.—*Preparation of diacetate of 4-hydroxy stigmasterol*

Ten grams of stigmasterol are dissolved in 50 cc. of benzene and there is then added a hot solution of four grams of selenium dioxide dissolved in 100 cc. of 98% acetic acid. The solution is refluxed for one hour, after which ten grams of sodium acetate are added and refluxing is continued for ten minutes, to coagulate the selenium product. The mixture is then poured into 200 cc. of water and the benzene layer separated. The solvent is removed from the benzene layer and the residue, consisting of a mixture of 4-hydroxy stigmasterol and 6-hydroxy stigmasterol, is dissolved in thirty cc. of acetic anhydride and heated under a reflux condenser for about one-half hour. The acetyl derivative of 4-hydroxy stigmasterol, which separates on cooling, is filtered off. The filtrate, containing diacetate of 6-hydroxy stigmasterol, is reserved for use in Example 3. The solid acetyl derivative is dissolved in 100 cc. of ether, treated with decolorizing charcoal and filtered. The filtrate from the decolorization is partially evaporated and 200 cc. of cold methyl alcohol is added to produce a crystalline product. This crystalline product is separated and after repeated crystallization from acetone and ethyl acetate yields a product melting at 200–201° C.

Anal. calc. for $C_{33}H_{52}O_4$: C, 77.3; H, 10.2. Found: C, 77.0; H, 10.3.

EXAMPLE 2.—*Preparation of 4-hydroxy stigmasterol*

Two grams of the diacetate of 4-hydroxy stigmasterol are dissolved in 200 cc. of alcohol. An excess of potassium hydroxide is added to the alcoholic solution and the whole refluxed for about one-half hour. Water is then added and the product extracted with ether. Solvent is removed from the extract and the residue taken up in and crystallized from acetone. It melts at 188° C.

Anal. calc. for $C_{29}H_{48}O_2$: C, 81.2; H, 11.3. Found: C, 80.9; H, 11.4.

EXAMPLE 3.—*Preparation of 6-hydroxy stigmasterol*

The acetic anhydride filtrate from preparation of 4-hydroxy stigmasterol in Example 1 is evaporated to dryness in vacuo. The residue is dissolved in 200 cc. of ethyl alcohol, refluxed for an hour with 6 grams of potassium hydroxide and then acidified with acetic acid. The product is then diluted with water to cause a solid to separate. The solid is filtered off, dissolved in ethyl alcohol and treated with decolorizing charcoal. The decolorized solution is evaporated down to smaller volume and cooled to give crystals which are separated and recrystallized from ethyl acetate to yield 6-hydroxy stigmasterol in the form of long needles melting at 237° C.

The 6-hydroxy stigmasterol of this example may also be designated as 22-dehydro-$\Delta^4$-stigmastene diol-3,6.

Anal. calc. for $C_{29}H_{48}O_2$: C, 81.2; H, 11.3. Found: C, 80.6; H, 11.2.

EXAMPLE 4.—*Preparation of 3-acetoxy-4-hydroxy stigmasterol*

110 grams of stigmasterol acetate are dissolved in 550 cc. of benzene and a hot solution of 45 grams of selenium dioxide in one liter of 98% acetic acid is added. The solution is refluxed for an hour and then 100 grams of sodium acetate added. The refluxing is continued for about a quarter of an hour to coagulate the selenium product. The mixture is then poured into two liters of water and the benzene layer separated. The benzene layer is concentrated to crystallization and the crystals filtered off. The crystals are dissolved in a mixture of equal parts of ether and acetone, the solution decolorized by treatment with decolorizing charcoal, filtered and concentrated to crystallization. Repeated crystallization from ether-acetone mixture and acetone-ethyl acetate mixture yields white plates of 3-acetoxy-4-hydroxy stigmasterol melting at 193–195° C. When heated with acetic anhydride, this compound yields the diacetate compound of Example 1.

Anal. calc. for $C_{31}H_{50}O_3$: C, 79.1; H, 10.6. Found: C, 79.6; H, 10.8.

EXAMPLE 5.—*Preparation of 4-hydroxy stigmastanol diacetate*

Two grams of the diacetate of 4-hydroxy stigmasterol are dissolved in 200 cc. of acetic acid containing 500 mgms. of platinum oxide and shaken with hydrogen at 45 pounds pressure for one hour. The hydrogenation catalyst is then filtered off and the acetic acid removed by vacuum distillation from the filtrate. The residue obtained is crystallized from ether-ethanol and acetone. It is 4-hydroxy stigmastanol diacetate melting at 153° C. and shows no melting point depression when mixed with the diacetate of 4-hydroxy sitostanol, with which it is identical, prepared as described below under Example 13.

Anal. calc. for $C_{33}H_5O_4$: C, 76.7; H, 10.9 Found: C, 76.9; H, 10.9.

EXAMPLE 6.—*Preparation of 4-hydroxy stigmastanol*

500 mgms. of diacetate of 4-hydroxy stigmastanol are treated with alcoholic potassium hydroxide solution to hydrolyze off the acetyl radicals. The product is diluted with water and extracted with ether. The ether is evaporated off to cause crystallization or separation of solid product which is then taken up in and crystallized from ethanol and then from acetone. The 4-hydroxy stigmastanol thereby obtained melts at 203° C. and gives no depression in melting point when mixed with 4-hydroxy sitostanol, with which it is identical, prepared as described below under Example 14.

EXAMPLE 7.—*Preparation of stigmastenone from 4-hydroxy stigmasterol*

One gram of 4-hydroxy stigmasterol is dissolved in 100 cc. of ethanol containing 5 cc. of concentrated hydrochloric acid and the solution refluxed for ten minutes. The alcohol is then evaporated off and the residue taken up in and crystallized from ether-methanol mixture, from acetone and from ethyl acetate. The crystals melt at 94° C. and give no depression in melting point when mixed with an authentic sample of stigmastenone.

In this example, instead of using hydrochloric acid, any other mineral acid such as sulfuric or phosphoric acid, could be used for the dehydration and rearrangement of the ring double-bond to the $\alpha,\beta$-position.

The method of this example can be used on a mono-ester or di-ester of hydroxy stigmasterol, such as the 3-acetoxy-4-hydroxy stigmasterol of Example 4 or the 4-hydroxy stigmasterol diacetate of Example 1. Finally, instead of starting with the 4-hydroxy compound or its esters, the corresponding 6-hydroxy compound obtained in Example 3 or its mono- and di-esters can be treated with mineral acid in alcohol in the same way to obtain stigmastenone. Wherever the mono- and di-esters are used, the conditions are practically the same as given above for 4-hydroxy stigmasterol, although refluxing for a slightly longer period of time may be necessary.

The stigmastenone of this example can be used as an intermediate in the preparation of the female sex hormone, progesterone. It can be converted to the latter by oxidizing the side-chain of stigmastenone to a 17-keto group.

EXAMPLE 8.—*Reduction of diacetate of 4-hydroxy stigmastanol*

One gram of the diacetate of 4-hydroxy stigmastanol is dissolved in a mixture of acetic acid and hydrochloric acid containing 15 grams of amalgamated zinc and the mixture refluxed for three hours. The reduction product is extracted with ether, the ether evaporated off and the residue sublimed in a high vacuum at 100° C. The sublimate is taken up in and crystallized from alcohol-ether mixture to give stigmastane melting at 84° C. and giving no melting point depression when mixed with sitostane, with which it is identical, prepared by the action of sodium and amyl alcohol on sitostyl chloride.

Anal. calc. for $C_{29}H_{52}$: C, 86.9; H, 13.1. Found: C, 87.2; H, 13.0.

The transformations of the above examples can be schematically shown by use of the following formulas:

Corresponding compounds to those of the above examples can be prepared when starting with other $C_{29}$-sterols and their derivatives and carrying out reactions analogous to those of the examples. This will be illustrated by the following examples of transformations carried out on sitosterol and its derivatives.

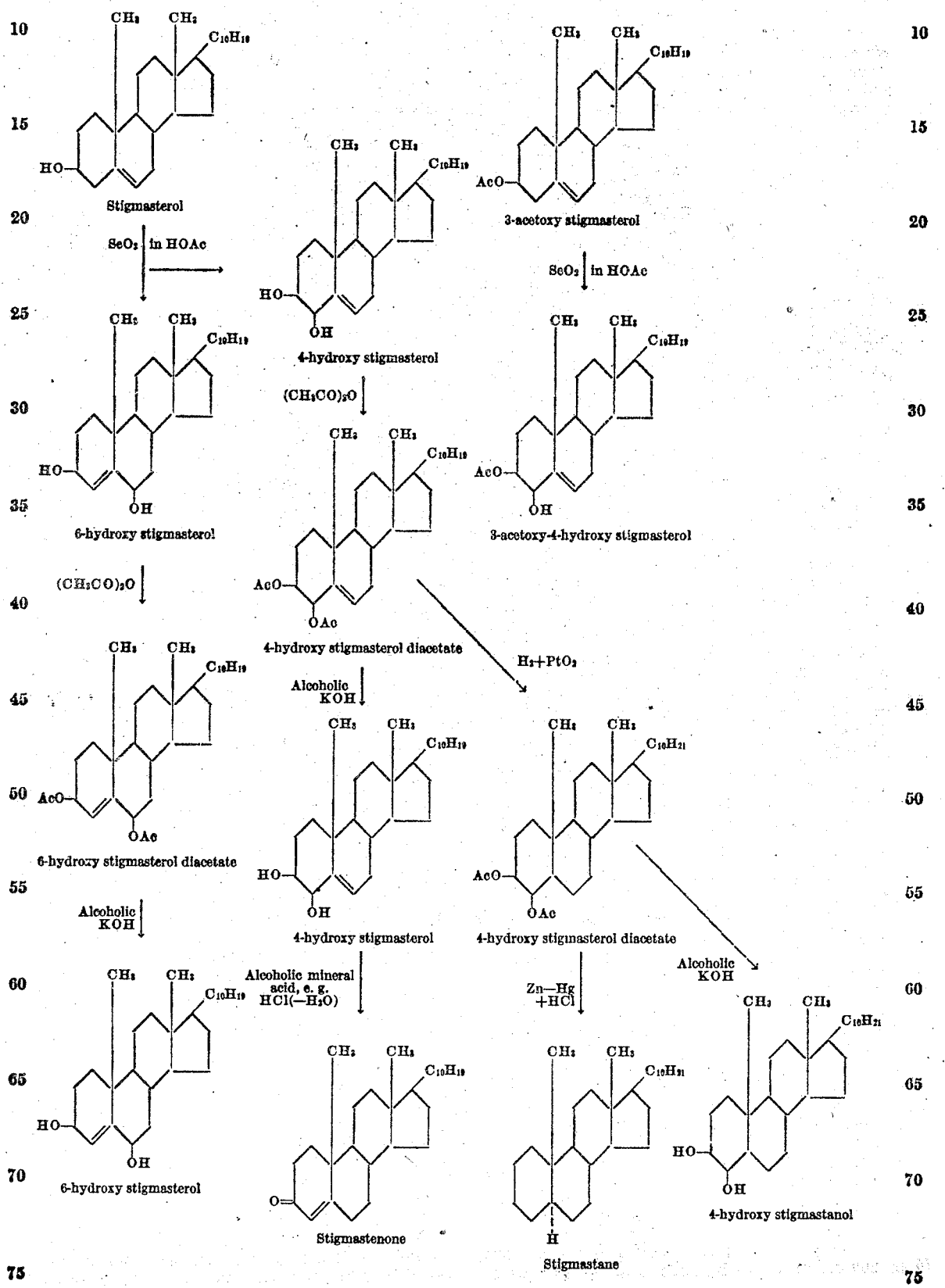

EXAMPLE 9.—*Preparation of diacetate of 4-hydroxy sitosterol*

A solution of forty grams of sitosteryl acetate in 200 cc. of warm benzene is added to a solution of 20 grams of selenium dioxide in 400 cc. of hot 98% acetic acid. Red selenium precipitates almost immediately. The mixture is refluxed on a steam bath for an hour, after which forty grams of sodium acetate are added and the refluxing is continued for ten or fifteen minutes longer. Water is added and the product extracted with ether. The ether is evaporated from the extract and the residue, consisting of a mixture of 3-acetoxy-4-hydroxy-sitosterol and 3-acetoxy-6-hydroxy-sitosterol, is refluxed with 120 cc. of acetic anhydride for thirty minutes. The solution is then cooled and the crystalline mass of the diacetate of 4-hydroxy sitosterol is filtered off. The filtrate, containing diacetate of 6-hydroxy sitosterol, is reserved for use in Example 11. The crystalline mass is dissolved in 200 cc. of ether. By adding 400 cc. of methanol to the ether solution and cooling, the diacetate of 4-hydroxy sitosterol crystallizes out in needles. It is recrystallized from acetone and ethyl acetate to a constant melting point of 167° C.

Anal. calc. for $C_{33}H_{54}O_4$: C, 77.0; H, 10.6. Found: C, 77.1; H, 10.7.

EXAMPLE 10.—*Preparation of 4-hydroxy sitosterol*

A solution of two grams of the diacetate of 4-hydroxy sitosterol in 50 cc. of ethanol is refluxed with potassium hydroxide solution for thirty minutes. Water is then added and the product extracted with ether. Solvent is removed from the extract and the residue is taken up in and crystallized from acetone and then ethyl acetate. It is 4-hydroxy sitosterol and melts at 184° C.

Anal. calc. for $C_{29}H_{50}O_2$: C, 80.8; H, 11.7. Found: C, 80.4; H, 11.8.

EXAMPLE 11.—*Preparation of 6-hydroxy sitosterol*

The acetic anhydride filtrate from the preparation of the diacetate of 4-hydroxy sitosterol in Example 9 is evaporated to dryness in vacuo and the residue dissolved in one liter of alcohol and hydrolyzed by refluxing for one hour with thirty grams of potassium hydroxide in 500 cc. of ethyl alcohol. The solution is diluted with water and the solids are filtered off, washed with ether, dissolved in ethyl alcohol, treated with decolorizing charcoal, and filtered. The filtrate, with or without previous concentration to smaller volume, is cooled to cause crystallization of fine needles of 6-hydroxy sitosterol. The needles are separated. When recrystallized from ethyl acetate, in which the 6-hydroxy sitosterol is only sparingly soluble, it melts at 250° C.

Anal. calc. for $C_{29}H_{50}O_2$: C, 80.85; H, 11.7. Found: C, 81.04; H, 11.75.

The diacetate of 6-hydroxy sitosterol is prepared by refluxing a portion of 6-hydroxy sitosterol with excess acetic anhydride, evaporating the reaction product to dryness and crystallizing the residue from ethyl acetate and methyl alcohol to obtain plates melting at 107° C. These plates of crystalline diacetate of 6-hydroxy sitosterol, when hydrolyzed, give the original diol melting at 250° C.

Anal. calc. for $C_{33}H_{54}O_4$: C, 77.0; H, 10.6. Found: C, 77.1; H, 10.6.

EXAMPLE 12.—*Preparation of 3-acetoxy-4-hydroxy sitosterol*

A solution of forty grams of sitosteryl acetate in 200 cc. of warm benzene is added to a solution of twenty grams of selenium dioxide in 400 cc. of hot 98% acetic acid. The mixture is refluxed on a steam bath for an hour, after which forty grams of sodium acetate are added and the refluxing is continued for ten or fifteen minutes longer. Water is added and the product extracted with ether. The ether extract containing benzene is concentrated down to crystallization, cooled and the crystals filtered off. The dark colored crystals are dissolved in a mixture of ether and acetone (2:1) and treated with decolorizing charcoal. The charcoal is filtered off and about half of the solvent removed from the filtrate by distillation. Upon cooling, the concentrated solution white plates come out and are separated. They are recrystallized from methanol and ethyl acetate to give 3-acetoxy-4-hydroxy sitosterol melting at 192° C.

Anal. calc. for $C_{31}H_{52}O_3$: C, 78.6; H, 11.2. Found: C, 78.7; H, 11.1.

When heated with acetic anhydride, this 3-acetoxy derivative is converted into the diacetate melting at 164–165° C.

EXAMPLE 13.—*Preparation of 4-hydroxy sitostanol diacetate*

Two grams of the diacetate of 4-hydroxy sitosterol are dissolved in 100 cc. of acetic acid containing 100 mgms. of platinum oxide and shaken with hydrogen at 45 pounds pressure for one hour. The catalyst is then filtered off and the acetic acid removed by vacuum distillation from the filtrate. The residue is crystallized from ether-ethanol and from acetone. It is 4-hydroxy sitostanol diacetate melting at 153° C.

Anal. calc. for $C_{33}H_{56}O_4$: C, 76.7; H, 10.9. Found: C, 76.7; H, 10.6.

EXAMPLE 14.—*Preparation of 4-hydroxy sitostanol*

An alcoholic solution of 500 mgms. of the diacetate of 4-hydroxy sitostanol is hydrolyzed by potassium hydroxide. The product of the hydrolysis is diluted with water and extracted with ether. Ether is evaporated off to cause crystallization or separation of solid product which is then taken up in and crystallized from ether-ethanol and from acetone. The 4-hydroxy sitostanol thereby obtained melts at 203° C. It is sparingly soluble in ether.

Anal. calc. for $C_{29}H_{52}O_2$: C, 80.5; H, 12.1. Found: C, 80.1; H, 12.2.

When the 4-hydroxy sitostanol of this example is reduced by the Clemmensen method, zinc amalgam and hydrochloric acid, as described in Example 8 for 4-hydroxy stigmastanol, there is produced the hydrocarbon, sitostane. It melts at 84° C. and is identical with the product of Example 8.

By way of proving that the 4-hydroxy sitostanol of this example is a $C_3$—$C_4$ diol of the same type as 4-hydroxy cholestanol, the following oxidation reactions were carried out.

(a) Oxidation of 4-hydroxy sitostanol.

A solution of 1.2 grams of chromium trioxide in 25 cc. of 90% acetic acid is added at 25° C. to a solution of one gram of 4-hydroxy sitostanol in 100 cc. of acetic acid. The solution is allowed to stand overnight at 25° C., diluted with methyl alcohol and evaporated "in vacuo" to dryness. The residue is treated with ether and water and the ether layer separated, washed with water and extracted with sodium carbonate solution. The sodium carbonate solution is extracted with ether, then acidified, and the acid liberated upon acidification is filtered off and taken up in and crystallized from benzene-pentane. The crystals of the acid obtained have a melting point of 200–205° C.

The acid is converted to the dimethyl ester by treatment with diazo methane. The dimethyl ester crystallizes readily from methyl alcohol and has a melting point of 123–124° C.

Anal. calc for $C_{31}H_{54}O_4$: C, 75.9; H, 11.1. Found: C, 75.7; H, 11.0.

(b) Oxidation of 4-hydroxy cholestanol.

A solution of 1.2 grams of chromium trioxide in 25 cc. of 90% acetic acid is added dropwise over a period of an hour to a solution of one gram of 4-hydroxy cholestanol, melting point 198–200° C., in 200 cc. of acetic acid at 15° C. The solution is stirred for several hours at 20° C. and allowed to stand overnight at 25° C. About 20 cc. of methyl alcohol are added and the solution evaporated "in vacuo" to dryness and the residue dissolved in 250 cc. of water and 250 cc. of ether. The ether layer is washed thoroughly with water and then extracted with sodium carbonate solution. The sodium carbonate solution, after being extracted with ether, is acidified to liberate a solid acid product which is filtered off and crystallized from benzene-pentane and also from dilute acetone. The acid has a melting point of 250° C. and gives no depression in melting point with the acid prepared by lead tetra-acetate and hydrogen peroxide oxidation of 4-hydroxy cholestanol.

Conversion of the acid to its dimethyl ester, using diazo methane, and crystallizing the ester from methyl alcohol gives needles melting at 123–124° C.

Anal. calc. for $C_{27}H_{46}O_4$: C, 74.6; H. 10.7. Found: C, 74.5; H, 10.7.

These oxidation reactions, which result in production of dicarboxylic acids, indicate that 4-hydroxy sitostanol has the same (allo-) configuration at $C_5$ as 4-hydroxy cholestanol, especially since similar oxidation of analogous compounds in the pregnane series, such as pregnantriol-3,4,20, yields a monocarboxylic acid The oxidation of 4-hydroxy sitostanol results in ring–A being broken between $C_3$ and $C_4$. In accordance with this, the formula of 4-hydroxy sitostanol is,

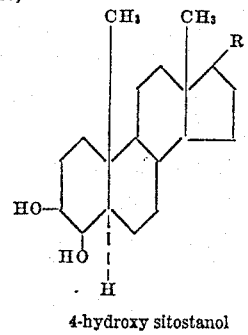

4-hydroxy sitostanol

EXAMPLE 15.—*Preparation of sitostenone from 4-hydroxy sitosterol*

A solution of one gram of 4-hydroxy sitosterol diacetate in 100 cc. of ethanol is refluxed ten minutes with 5 cc. of concentrated hydrochloric acid or other suitable mineral acid. The alcohol is then evaporated off and the residue taken up in and crystallized from ethyl acetate and from acetone. It melts at 83° C. and gives no depression in melting point when mixed with a sample of sitostenone prepared by distilling sitosterol from copper.

In this example, instead of using hydrochloric acid, any other mineral acid, such as sulfuric or phosphoric acid, could be used for the dehydration and rearrangement of the ring double-bond to the α, β-position.

The method of this example can be applied to the mono-esters or di-esters of hydroxy sitosterol, such as the 3-acetoxy-4-hydroxy sitosterol of Example 12 or the 4-hydroxy sitosterol diacetate of Example 9. Sitostenone is obtained in all of these instances. It is also obtained when starting with 6-hydroxy sitosterol or its mono- or di-esters, for example when starting with 6-hydroxy sitosterol or its diacetate described under Example 11.

In converting the diol compounds of the invention into their corresponding derivatives capable upon hydrolysis of giving hydroxy compounds, any of the known methods for converting secondary hydroxyl groups into esters and ethers or halogen compounds may be employed. For instance, in the examples given instead of using acetic anhydride, any other suitable organic acid anhydride or carboxylic acid halide may be used for converting the hydroxyl groups into the group —O—acyl. The hydroxyl radicals of the compounds of the invention can also be replaced by halogen through the use of any of the known halogenating agents, such as phosphorus halide, a thionyl halide like thionyl chloride, etc.

In the formation of alky-, aralkyl- or aryl-ethers wherein the hydroxyl is replaced by —O—alkyl, —O—aralkyl or —O—aryl, ordinary methods for ether formation are used, such as reaction of the hydroxy sterol compound with alkali metal to convert it to an alcoholate and then reacting with a halogenated hydrocarbon, such as an alkyl halide. When the hydroxyl groups are to be replaced by —O—aryl, a phenolic compound can be reacted in the presence of caustic alkali with the corresponding sterol derivatives, having hydroxyl replaced by halogen or equivalent acid radical, such as the sulfate radical.

What I claim as my invention is:

1. Process for the preparation of an α, β-unsaturated 3-keto sterol compound which comprises partially oxidizing, by selenious acid oxidation, a compound of the group consisting of a sterol having a side chain of ten carbon atoms attached to the 17-position of the sterol nucleus and derivatives of said sterol wherein its 3-hydroxyl group is replaced by a group which is readily hydrolyzable into a hydroxyl group, to form a dihydoxy derivative of said sterol, and treating the dihydroxy derivative with mineral acid to rearrange it into the α, β-unsaturated 3-keto sterol compound.

2. Process for the preparation of an α, β-unsaturated 3-keto sterol compound which comprises partially oxidizing, by selenious acid oxidation, a compound of the group consisting of a sterol having an unsaturated side chain of ten carbon atoms attached to the 17-position of the sterol nucleus and derivatives of said sterol wherein its 3-hydroxyl group is replaced by a carboxylic acid ester group, to form a dihydroxy derivative of said sterol, and treating the dihydroxy derivative with mineral acid to rearrange it into the α, β-unsaturated 3-keto sterol compound.

3. Process for the preparation of stigmastenone which comprises partially oxidizing, by selenious acid oxidation, a compound of the group consisting of stigmasterol and derivatives of stigmasterol wherein its 3-hydroxyl group is replaced by a carboxylic acid group, to form a dihydroxy derivative of stigmasterol, and treating the dihydroxy derivative with mineral acid to rearrange it into stigmastenone.

4. Process for the preparation of stigmastenone which comprises partially oxidizing stigmasterol, by selenious acid oxidation, to form 4-hydroxy stigmasterol, and treating the latter with mineral acid to rearrange it into stigmastenone.

5. In a process for the preparation of an $\alpha,\beta$-unsaturated 3-keto sterol compound, the step which comprises partially oxidizing, by selenious acid oxidation, a compound of the group consisting of a sterol having a side chain of ten carbon atoms attached to the 17-position of the sterol nucleus, and derivatives of said sterol wherein its 3-hydroxyl group is replaced by a group which is hydrolyzable into a hydroxyl group.

6. In a process for the preparation of an $\alpha,\beta$-unsaturated 3-keto sterol compound, the step which comprises partially oxidizing, by selenious acid oxidation, a compound of the group consisting of a sterol having an unsaturated side chain of ten carbon atoms attached to the 17-position of the sterol nucleus, and derivatives of said sterol wherein its 3-hydroxyl group is replaced by a carboxylic acid ester group, to form a dihydroxy derivative of said sterol.

7. In a process for the preparation of stigmastenone, the step which comprises partially oxidizing, by selenious acid oxidation, a compound of the group consisting of stigmasterol and derivatives of stigmasterol wherein its 3-hydroxyl group is replaced by a carboxylic acid group, to form a dihydroxy derivative of stigmasterol.

8. The step which comprises treating with strong mineral acid a member of the group consisting of 4-hydroxy- and 6-hydroxy sterols having a side chain of ten carbon atoms attached to the 17-position of the sterol nucleus, and an unsaturated double-bond connected with the No. 5 carbon atom of the sterol nucleus, and their derivatives wherein at least one of the hydroxyl groups is replaced by a group which is readily hydrolyzable into a hydroxyl group.

9. The step which comprises treating with a strong mineral acid a member of the group consisting of 4-hydroxy- and 6-hydroxy-stigmasterol, and their derivatives wherein at least one of the hydroxyl groups is replaced by a group which is readily hydrolyzable into a hydroxyl group.

10. The step which comprises treating 4-hydroxy stigmasterol with a strong mineral acid.

11. A member of the group comprising 4-hydroxy stigmasterol, 6-hydroxy stigmasterol and derivatives of said hydroxy stigmasterol compounds wherein at least one of the hydroxyl groups of said derivatives is replaced by a group which upon hydrolysis is converted into a hydroxyl group.

12. A member of the group comprising 4-hydroxy stigmasterol and derivatives thereof wherein at least one of the two hydroxyl groups of 4-hydroxy stigmasterol is replaced by a group which upon hydrolysis is converted into a hydroxyl group.

13. A member of the group comprising 4-hydroxy stigmasterol and derivatives thereof wherein at least one hydroxyl group is replaced by a carboxylic acid ester group.

14. 4-hydroxy stigmasterol.

15. 6-hydroxy stigmasterol.

16. 4-hydroxy sitosterol.

RUSSELL EARL MARKER.